(12) United States Patent
Favrat et al.

(10) Patent No.: US 11,965,659 B2
(45) Date of Patent: Apr. 23, 2024

(54) METHODS AND SYSTEMS FOR DISTRICT ENERGY CO2 SUPPORT

(71) Applicant: ExerGo SA, Sion (CH)

(72) Inventors: Daniel Favrat, Epalinges (CH); Alberto Mian, Birmensdorf (CH)

(73) Assignee: ExerGo SA, Yverdon-les-Bains (CH)

( * ) Notice: Subject to any disclaimer, the term of this patent is extended or adjusted under 35 U.S.C. 154(b) by 0 days.

(21) Appl. No.: 17/791,808

(22) PCT Filed: Jan. 8, 2021

(86) PCT No.: PCT/IB2021/050128
§ 371 (c)(1),
(2) Date: Jul. 8, 2022

(87) PCT Pub. No.: WO2021/156685
PCT Pub. Date: Aug. 12, 2021

(65) Prior Publication Data
US 2023/0039702 A1    Feb. 9, 2023

(30) Foreign Application Priority Data

Jan. 10, 2020  (WO) .................. PCT/IB2020/050175

(51) Int. Cl.
*F24D 10/00* (2022.01)
*F24D 5/12* (2006.01)

(52) U.S. Cl.
CPC ............. *F24D 10/003* (2013.01); *F24D 5/12* (2013.01)

(58) Field of Classification Search
CPC . F24D 7/00; F24D 5/12; F24D 10/003; F24D 10/00; Y02P 80/14; Y02E 20/14
See application file for complete search history.

(56) References Cited

U.S. PATENT DOCUMENTS

| | | | | |
|---|---|---|---|---|
| 2010/0018668 | A1* | 1/2010 | Favrat | F24D 12/02 |
| | | | | 165/104.34 |
| 2012/0117979 | A1 | 5/2012 | Facchinetti et al. | |

FOREIGN PATENT DOCUMENTS

| | | |
|---|---|---|
| CH | 712294 A2 | 9/2017 |
| EP | 2122257 B1 | 11/2009 |
| | (Continued) | |

OTHER PUBLICATIONS

International Search Report dated May 6, 2021, for Application N° PCT/IB2021/050128.

(Continued)

*Primary Examiner* — Frantz F Jules
*Assistant Examiner* — Martha Tadesse
(74) *Attorney, Agent, or Firm* — Nixon & Vanderhye P.C.

(57) ABSTRACT

The invention concerns a district energy system comprising: —at least one cogeneration or heat pump unit —a first pipe system for district heating and/or cooling consisting of at least one liquid or vapor $CO_2$ pipe; characterized by the fact that is also comprises a second pipe system consisting of at least one fluid line for the transport of $CO_2$ or $O_2$. The invention also relates to the use of a district energy system comprising: —at least one cogeneration or heat pump unit, —a first pipe system, —a second pipe system; characterized by the fact that that liquid or vapor $CO_2$ is used in the first pipe system for district heating and/or cooling and that a fluid of $CO_2$ or $O_2$ is used in the second pipe system.

8 Claims, 2 Drawing Sheets

(56) References Cited

FOREIGN PATENT DOCUMENTS

Figure 1:
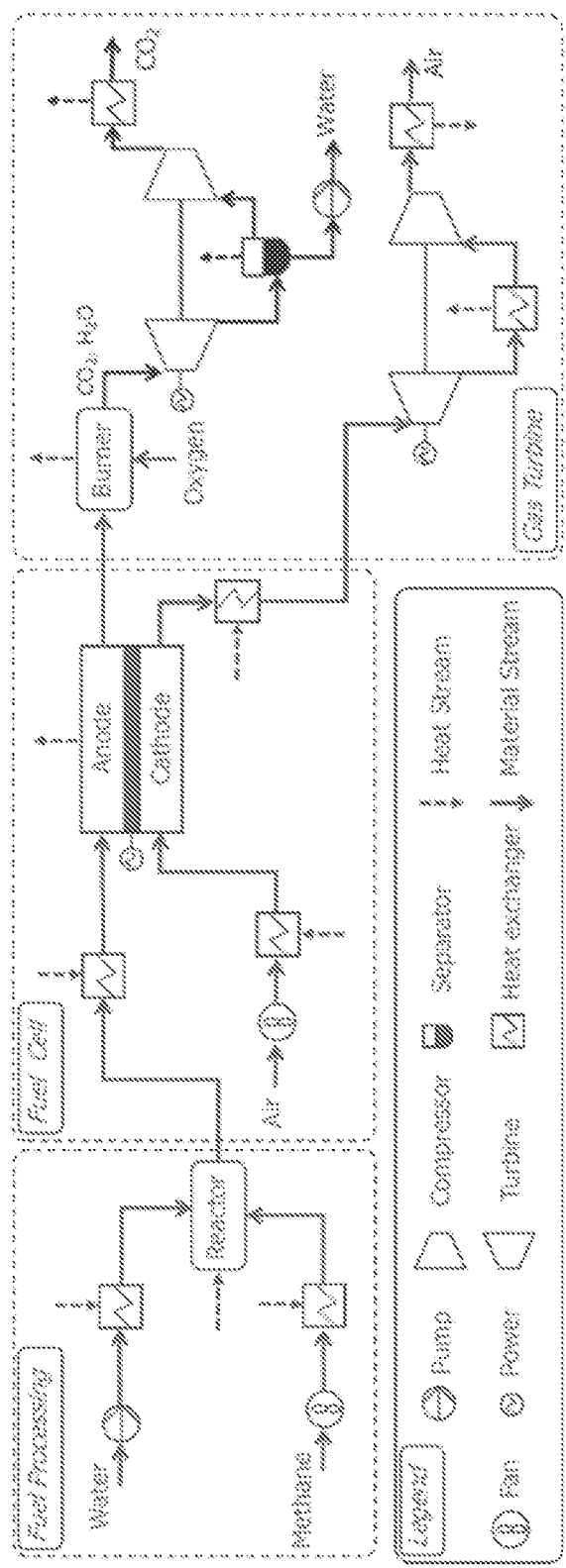
Figure 2:
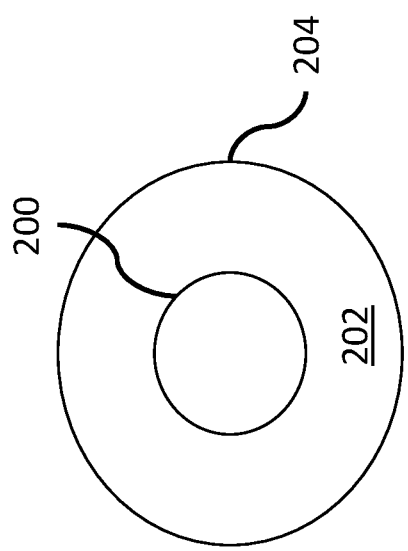

| | | |
|---|---|---|
| EP | 2449229 B1 | 5/2012 |
| GB | 2122715 B | 1/1984 |
| JP | 2001116170 A | 4/2001 |
| KR | 20150037411 A | 4/2015 |
| KR | 101531159 B1 | 6/2015 |
| KR | 101936327 B1 | 1/2019 |
| WO | WO 8301824 | 5/1983 |
| WO | WO 2008102292 | 8/2008 |
| WO | WO 2019228809 | 12/2019 |
| WO | WO-2019228809 A1 * | 12/2019 |

OTHER PUBLICATIONS

Written Opinion of the International Preliminary Examining Authority dated Dec. 20, 2021, for Application N° PCT/IB2021/050128.
Written Opinion of the International Searching Authority dated May 6, 2021, for Application N° PCT/IB2021/050128.

* cited by examiner

METHODS AND SYSTEMS FOR DISTRICT ENERGY CO2 SUPPORT

CROSS REFERENCE TO RELATED APPLICATIONS

The present application is a United States national stage application of International patent application No. PCT/IB2021/050128 filed on Jan. 8, 2021 that designated the United States, and claims foreign priority to International patent application No. PCT/IB2020/050175 filed on Jan. 10, 2020, the contents of both documents being herewith incorporated by reference in their entirety.

FIELD OF INVENTION

The present invention relates to district energy, i.e. district heating and/or district cooling.

It more precisely relates to district energy that use $CO_2$ as energy transport medium.

CROSS-REFERENCE TO RELATED PATENT APPLICATION

This patent application claims priority from and is related to International Patent Application PCT/IB2020/050175, filed on Jan. 10, 2020, this Patent Application incorporated by reference in its entirety herein.

STATE OF THE ART $CO_2$ based district energy systems (see for instance EP 2 122 257 B1) have been proposed which consist of one main $CO_2$ liquid and one main $CO_2$ vapor pipe, both close to the same saturation pressure in a temperature range between 10 and 18° C. $CO_2$ is vaporized or condensed, according to the network balancing needs (network behaving as a heat sink or as a heat source).

The thermal energy required to evaporate (condense) $CO_2$ is provided using either a heat pump or a heat exchanger.

This implies a pressure of the order of 50 bars in both pipes in order to exploit mainly the latent heat of evaporation or condensation of $CO_2$ and therefore provide heat or receive at constant temperature.

GENERAL DESCRIPTION OF THE INVENTION

The district energy system according to the present invention provides alternatives and/or improvements with respect to the state of the art.

To this effect it comprises:
at least one cogeneration or heat pump unit,
a first pipe system for district heating and/or cooling consisting of at least one liquid or vapor $CO_2$ pipe.

The system according to the invention is characterized by the fact that is also comprises a second pipe system consisting of at least one fluid line for the transport of $CO_2$ or $O_2$.

According to one embodiment, the second pipe system comprises an external pipe and wherein said $CO_2$ pipe is at least partially contained within said external pipe in a way as to define said fluid line as an annular space between both pipes.

The fluid line may be advantageously used for the transport of the $CO_2$ captured from the flue gas produced by said unit(s).

Preferably, the fluid line is prefilled with $CO_2$ at relatively reduced pressure, i.e. at a lower pressure than the pressure in said $CO_2$ pipe.

According to another embodiment, the second pipe system is also used for district heating and/or cooling, in the same way as disclosed in EP 2 122 157 B1.

In this configuration the said $CO_2$ pipe is a liquid pipe and the fluid line is a vapor $CO_2$ line.

According to another embodiment, the fluid line consists of a separate pipe that is adapted to provide $O_2$ or a $O_2$ enriched mixture without nitrogen to said cogeneration unit or to a post-combustion unit, in a way to increase the concentration of $CO_2$ and $H_2O$ in the flue gases and therefore to facilitate their separation.

DETAILED DESCRIPTION OF THE INVENTION

The invention will be better understood in the present chapter, with 3 non-limiting examples.

Example 1: $CO_2$ Transport at Reduced Pressure from Cogeneration Units, Thermally Driven Heat Pumps with $CO_2$ Separation or any Other Carbon Capture Technology In existing systems, for additional safety reasons or to capture small diffusion leaks or to reduce heat transfer from the ground or to offer flexibility for changing the main $CO_2$ pipes over time, an external pipe might be proposed around either one or each of the two main $CO_2$ pipes. The network consists then of two sets of quasi-concentric pipes.

The word "quasi-concentric" is used since the main pipe 200 might just lie inside its external pipe 204 with or without inserts to maintain it in the middle of the external pipe.

As mentioned in EP 2 122 257 B1 the network can be used to collect and transport $CO_2$ from decentralized carbon or hydrocarbon fuel-based cogeneration units equipped with $CO_2$ separation from their flue gas. It can also do the same for carbon or hydrocarbon fuel-based heat pumps that would also be equipped with $CO_2$ separation from their flue gas. Example of cogeneration unit would be the SOFC-GT units such as disclosed in EP 2 449229B1. Examples among heat pumps would be fuel driven absorption heat pumps (thermally driven heat pump in which the heat source is based on the combustion of a fuel, preferably natural gas). By extension, it could also transport $CO_2$ from a fuel boiler equipped with $CO_2$ separation. However the $CO_2$ captured from the flue gas of these different units needs to be of high level of purity in order not to contaminate the main network with non-condensable gas and it should be pressurized at the pressure level of the main network (around 50 bars) while the flue gas might be at a much lower level of pressure. The requirement of having a $CO_2$ compressor with such pressure ratio is both costly and energetically less efficient.

The purpose of the present invention according to this first embodiment is to use the annular section 202 of the quasi concentric pipes (either the liquid or the vapor pipes or both) to transport the $CO_2$ captured from the decentralized fuel-based cogeneration or heat pump units.

Advantageously, the annular space between each of the main pipes is initially filled with, preferably low pressure, gaseous $CO_2$. The transported $CO_2$ is preferably down-loaded at the central balancing plant (also called District Heating and Cooling plant—DHCplant) where it can be purified if needs be, compressed and stored centrally or directly used in a power to gas unit. In a power to gas it would be combined with $H_2$ produced by excess electricity (for example from renewables) to form synthetic renewable methane. When no power to gas exist at the DHCplant, the $CO_2$ can be separately transported to another location or sent to an underground $CO_2$ storage plant using high pressure pipelines. In all these cases of use of the recovered $CO_2$ from the decentralized fuel-based units only one compressor at the DHCplant may be used instead of the decentralized $CO_2$ compressors close to the decentralized fuel-based units that would be needed if $CO_2$ was to be reinjected in the main $CO_2$ vapor pipe. This translates into economic and energetic gains. In the case where there are no external pipes around the 2 main pipes, a third pipe is introduced for the transport of the low pressure $CO_2$ captured from decentralized fuel-based units.

Example 2: $CO_2$ Liquid Pipe within $CO_2$ Vapor Pipe

BLEVE is a boiling liquid expanding vapor explosion that might occur with sudden depressurization of the order of tens of bars occurs, although these phenomena are not well-documented in a case of a tube surrounded by an outer tube. Note also that those are not very well-known phenomena and they could potentially occur in all heat pumps working with supercritical $CO_2$ the number of which is fast growing and without any BLEVE being reported so far.

Considering the fact that the liquid pipe is potentially more dangerous that the vapor pipe due to the potential occurrence of phenomena like BLEVE in case of pipe failure, the invention according to this embodiment consists in the insertion of the liquid $CO_2$ pipe within the $CO_2$ vapor pipe, the gas flowing in the quasi-annular space between the outer diameter of the liquid pipe and the inner diameter of the vapor pipe. As a reminder the pressures in both pipes is of the same order so the advent of BLEVE phenomena could not take place. Furthermore, any leak from the liquid pipe (diffusion or others) would be captured in the vapor pipe. This simple configuration does however not allow the recovery of low pressure $CO_2$ from fuel-based units.

This coaxial main dual pipe arrangement may itself be located within an outside pipe of larger diameter than the external diameter of the main vapor pipe, allowing thereby the low-pressure $CO_2$ recovery from minor leaks or from decentralized fuel-based units with $CO_2$ separation for their further transportation to the DHCplant.

Example 3: $O_2$ Input Additional Line

The $CO_2$ network can be connected to a fuel cell-based cogeneration system with $CO_2$ separation like the one described e.g. in EP 2 449 229 B1. A Solid Oxide Fuel cell fed by natural gas can exploit economically only about 85 to 95% of the fuel (that is oxidized in the absence of nitrogen since only oxygen from air travels from the cathodic to the anodic side of the fuel cell). FIG. 1 shows a fuel-based cogeneration unit with $CO_2$ separation, in this case a hybrid SOFC-GT fed with natural gas. The remaining fraction from the anodic flue gas needs to be oxidized by (post-)combustion (burner in the FIG. 1). If this post-combustion is done using air as an oxidant it reintroduces nitrogen in the system and complicates the separation of $CO_2$ and $H_2O$ in the resulting anodic flue gas with a loss of efficiency. Therefore it is highly desirable to realize this post-combustion either with pure oxygen or at least with an $O_2$ enriched mixture that does not contain nitrogen.

The invention is to add to the main pipe(s) a separate and comparatively significantly smaller pipe transporting $O_2$ or $O_2$ enriched mixture without nitrogen. This avoid the need for decentralized oxygen delivery by bottles or other means.

When the central balancing plant (DHC plant) is associated with a power to gas unit some of the $O_2$ produced in the hydrolyser of the latter can directly be recovered and transported through the $O_2$ pipe.

The invention claimed is:

1. A district energy system comprising:
    a cogeneration or heat pump unit;
    a first pipe system for district heating and/or cooling including a liquid or vapor $CO_2$ pipe; and
    a second pipe system including a fluid line for a transport of $CO_2$ or $O_2$, wherein the second pipe system further includes an external pipe,
    wherein the fluid line of the second pipe system is at least partially contained within the external pipe to define the fluid line as an annular space between the fluid line and the external pipe.

2. The district energy system according to claim 1, wherein the fluid line is used for the transport of the $CO_2$ captured from flue gas produced by the cogeneration or heat pump unit.

3. The district energy system according to claim 2, wherein the fluid line is prefilled with a gaseous $CO_2$ at a reduced pressure that is less than a pressure in the $CO_2$ pipe.

4. The district energy system according to claim 1, wherein the second pipe system is also used for district heating and/or cooling.

5. The district energy system according to claim 4, the $CO_2$ pipe is liquid pipe and the fluid line is vapor $CO_2$ line.

6. A district energy system comprising:
    a cogeneration or heat pump unit;
    a first pipe system for district heating and/or cooling including a liquid or vapor $CO_2$ pipe; and
    a second pipe system including a fluid line for a transport of $CO_2$ or $O_2$, wherein the fluid line includes a separate pipe that is configured to provide $O_2$ or a $O_2$ enriched mixture without nitrogen to the cogeneration or heat pump unit or to a post-combustion unit, to increase the concentration of $CO_2$ and $H_2O$ in flue gases to facilitate their separation.

7. A method for using a district energy system, the district energy system including a cogeneration or heat pump unit, a first pipe system, and a second pipe system, the method comprising the steps of
    using a liquid or vapor $CO_2$ in the first pipe system for district heating and/or cooling;
    using a fluid of $CO_2$ or $O_2$ in the second pipe system; and
    separately inputting $O_2$ or a $O_2$ enriched mixture without nitrogen to the cogeneration or heat pump unit or to a post-combustion unit, to increase the concentration of $CO_2$ and $H_2O$ in flue gases to facilitate their separation.

8. The method according to claim 7, wherein $CO_2$ used in the second pipe system has a lower pressure than the $CO_2$ or $O_2$ pressure within the first pipe system.

* * * * *